(12) United States Patent
De Morais et al.

(10) Patent No.: US 12,522,979 B2
(45) Date of Patent: Jan. 13, 2026

(54) METHOD TO TREAT A CONDENSATE IN A PULPING PROCESS

(71) Applicants: SUZANO S.A., Salvador (BR); NIKEDE COMERCIO E REPRESENTAÇÕES LTDA., São Paulo (BR)

(72) Inventors: Dimas De Morais, São Paulo (BR); Otávio Mambrim Filho, Espírito Santo (BR)

(73) Assignees: Suzano S.A., Salvador (BR); NIKEDE COMERCIO E REPRESENTAÇÕES LTDA, São Paulo (BR)

( * ) Notice: Subject to any disclaimer, the term of this patent is extended or adjusted under 35 U.S.C. 154(b) by 133 days.

(21) Appl. No.: 18/010,362

(22) PCT Filed: Jun. 17, 2021

(86) PCT No.: PCT/BR2021/050264
§ 371 (c)(1),
(2) Date: Dec. 14, 2022

(87) PCT Pub. No.: WO2021/253107
PCT Pub. Date: Dec. 23, 2021

(65) Prior Publication Data
US 2023/0265610 A1    Aug. 24, 2023

Related U.S. Application Data

(60) Provisional application No. 63/040,282, filed on Jun. 17, 2020.

(51) Int. Cl.
*D21C 9/08* (2006.01)
*D21C 3/06* (2006.01)

(52) U.S. Cl.
CPC ............... *D21C 9/086* (2013.01); *D21C 3/06* (2013.01)

(58) Field of Classification Search
CPC ...... D21C 9/086; D21C 3/06; D21C 11/0007; D21C 11/10; D21C 9/08
See application file for complete search history.

(56) References Cited

U.S. PATENT DOCUMENTS

| 4,140,609 | A | 2/1979 | Zucker |
| 4,764,597 | A | 8/1988 | Dilling |

(Continued)

FOREIGN PATENT DOCUMENTS

| BR | 112014000657-1 A2 | 2/2014 |
| BR | 102013033274 A2 | 9/2015 |

(Continued)

OTHER PUBLICATIONS

English translation of KR101600271B1 retrieved from Espacenet Sep. 9, 2024 (Year: 2024).*

(Continued)

*Primary Examiner* — Abbas Rashid
*Assistant Examiner* — Elisa H Vera

(57) ABSTRACT

The present invention is related to a method to produce a treated condensate substantially free of organic matter by treating the condensate with at least one of physical, chemical, chemical-physical treatment or combinations thereof. Further, it is also provided a method to treat a condensate in a pulp processing fiber line utilizing multiple washing stages having at least a treated condensate circulating in a closed loop, prior to feeding the condensate into the fiber line, the method comprising the steps of: a) identifying the colloidal organic compounds in the condensate; b) subjecting the condensate to at least one chemical, physical, chemical-physical treatment or a combination thereof; and c) reducing (Continued)

contamination of the condensate, feeding it to the last washer stage, or to some other stage of the pulping.

15 Claims, 7 Drawing Sheets

(56) References Cited

U.S. PATENT DOCUMENTS

| | | | |
|---|---|---|---|
| 2004/0134630 A1* | 7/2004 | Lahtinen | D21C 9/02 162/49 |
| 2005/0173088 A1 | 8/2005 | Grimsley et al. | |
| 2013/0072724 A1 | 3/2013 | Milestone et al. | |
| 2014/0251318 A1 | 9/2014 | Shevchenko et al. | |
| 2015/0044127 A1 | 2/2015 | Gantenbein et al. | |
| 2018/0023251 A1* | 1/2018 | Baker | D21C 9/08 127/37 |

FOREIGN PATENT DOCUMENTS

| | | | |
|---|---|---|---|
| BR | 112019015580-5 A2 | 3/2020 | |
| CA | 1136032 A | 11/1982 | |
| CN | 1844572 A | 10/2006 | |
| CN | 102852028 A | 1/2013 | |
| EP | 1392913 B1 | 7/2009 | |
| EP | 1294644 B1 * | 7/2010 | C02F 1/50 |
| JP | S4838322 B1 | 11/1973 | |
| JP | S57191389 A | 11/1982 | |
| JP | H11033563 | 2/1999 | |
| JP | 2010216040 A | 9/2010 | |
| JP | 2016079524 A | 5/2016 | |
| JP | 2016168514 A | 9/2016 | |
| JP | 2020029631 A | 2/2020 | |
| KR | 101600271 B1 * | 3/2016 | |

OTHER PUBLICATIONS

International Search Report for International Application No. PCT/BR2021/050264, mailed Sep. 24, 2021 (4 pages).

Masao Oikawa, Function and Selection of Synthetic Flocculants and their Application, Shinko Faudora Technical Report, 1989, vol. 33 No. 2, 38-42.

Japan Application No. 2022-578688; First office action dated Jun. 12, 2025.

European Application No. 21826040; Communication pursuant to Article 94(3); dated Jan. 27, 2025.

* cited by examiner

METHOD TO TREAT A CONDENSATE IN A PULPING PROCESS

CROSS-REFERENCE TO RELATED APPLICATIONS

This application is a U.S. National phase filing of international patent application serial number PCT/BR2021/050264, entitled "METHOD TO TREAT A CONDENSATE IN A PULPING PROCESS", filed Jun. 17, 2021, which claims priority of U.S. Provisional Application No. 63/040,282, filed Jun. 17, 2020. The contents of the above-referenced applications are incorporated herein by reference in their entireties for all purposes.

FIELD OF INVENTION

The present invention relates to methods to produce a treated condensate substantially free of organic matter and pitch colloidal by treating the condensate with at least one of physical, chemical, chemical-physical treatment or combinations thereof.

BACKGROUND

Industrial processes for production of cellulose-rich pulps from harvested wood are well-known and typically involve the steps of physical disruption of wood into smaller pieces and particles followed by chemical digestion under elevated temperatures and pressures to dissolve and separate the lignin from the constituent cellulosic fibrous biomass.

In chemical pulping, the wood chips are digested with chemical solutions to solubilize a portion of the lignin and the effect is the removal of the lignin, extractives and inorganics. The most usual digestive procedures are the sulfite, soda, sulfate, or Kraft and modified Kraft-processes.

The resulting material after digestion and washing steps of the wood is a generally darkly colored cellulose fiber. The dark color is due to that not all the lignin has been removed during digestion and the remaining lignin has been chemically modified. This dark pulp is commonly referred to as unbleached pulp or brown stock. It may pass directly to the papermaking operation if the paper color is unimportant or otherwise, the unbleached lignocellulosic pulps are bleached. Bleaching is a term applied to a semi-chemical or chemical step in which the pulp is treated with an active bleaching agent, such as chlorine, chlorine dioxide, ozone, oxygen, hydrogen peroxide, enzymes, or a mixture thereof, at a controlled time, temperature, and pH. The desired outcome of these reactions is to brighten the pulp to ever-higher levels of brightness. Pulp bleaching is most often a multi-stage process employing chlorine or chlorine-containing compounds such as calcium hypochlorite, sodium hypochlorite and chlorine dioxide. The chlorine bleaching of lignocellulosic pulps are the processes well known in the art.

The pulping process in a fiber line includes a basic sequential unit of cooking, brown stock washing, oxygen delignification and screening. This pulping process is usually preceded by chemical or mechanical pretreatment of prepared wood fiber chips. Each step of the pulping process is usually performed with a water washing, which may be with process liquids obtained elsewhere in the process, as by countercurrent washing which has attendant conservation advantages. In this sense, current fiber lines re-use evaporated water from the process in order to decrease environmental impacts.

After digestion has been completed, the solids comprising the cellulosic fibrous pulps are separated from the spent digestion liquids which are commonly referred to as black liquors and typically comprise organic solvents, solubilized lignin, solid and particulate monosaccharides, oligosaccharides, polysaccharides and other organic compounds released from the wood during the chemical digestion.

Lignin and the products resulting from a Kraft or modified Kraft process make up the black liquor, which is separated in the washing plant, and sent to evaporators to raise the solids concentration and to a recovery boiler. In this equipment, black liquor is usually used as a fuel to produce steam and electricity, where most the chemicals used in the Kraft process are recovered. Condensates are typically reintroduced in the pulping process, with or without added water, in the brown pulp washing system The washing of a cellulose pulp from digestion is usually carried out with water or process condensates. i.e. a black liquor evaporation system, whose system works in counter current to the fiber line washers. To decrease liquid and gaseous wastes the washing is performed by closing liquid circulation systems in the process. Pulp washing is performed with a multistage counter-current sequence, where the cleanest water is added in the last stage and the resulting filtrate is used in the preceding stage until it reaches the blow tank or wash zone in a continuous digester.

The purpose of washing the brown pulp after cooking is to remove the maximum amount of dissolved organic materials from the wood and soluble inorganic materials from the cooking liquor mixed with the pulp at the end of cooking, using the minimum amount of clean or recirculated water from process, to facilitate the bleaching process and reduce the cost of replacing chemicals that are lost in the process.

Recovery of organic matter, i.e. dissolved lignin and carbohydrates plays a role further downstream in the process. For mills that have oxygen delignification and/or bleaching sequences, elimination of organic chemicals in the pulp entering these processes reduces operating costs. Because these stages are oxidative in nature, improved lignin removal through enhanced brown stock washing will result in reduced process chemical consumption and reduced load to the waste and effluent treatment plant. Also, brown stock washing assists in the removal of undesirable material such as metals, pitch, and wood extractives. Wood extractives that are not successfully removed from the pulp by washing tend to concentrate in downstream processes and form sticky deposits on equipment, which in turn can result in the production of off-quality pulp and/or paper through the formation of spots and holes. Stripping methods of the condensate after evaporation is also another effort to remove organic substances, usually non condensed gases.

In this sense, Opedal et al. in their review article *Colloidal stability and removal of extractives from industrial process water in thermomechanical pulping* teach that physico-chemical operations such as sedimentation, flocculation, filtration and pH reduction are efficient to separate extractives in process waters, that is, waters from the thermomechanical pulping process, that will be reused, thus performing pitch control in the thermomechanical pulping process.

However, considering a Kraft pulping process, it was identified that the condensate from evaporating the black liquor, although previously thought as free from contaminants, still carries significant amount of organic compounds, specifically organic compounds as colloids—pitch —, which bring several drawbacks when the condensate is used in a washing pulping process.

Since the benefits of reusing condensate are many, such as reduction of use of energy and water resources, improvement of working conditions, improvement in the brown mass washing system, reduced consumption of bleach chemicals such as peroxide, ozone, chlorine dioxide, reduction of carbon footprint reduction, reduction in fuel consumption, reuse of the sensible heat measured in the present thermal energy, this in turn reduces the amount of energy needed to transform the water into steam, positive impact on the environment, reduction of the use of fuel, and reduction of emissions of $CO_2$, NOx, $SO_x$, $AO_x$, there still a need in the art to eliminate organic contaminants from the condensate which is being reused in the pulping process.

Therefore, a process to treat the condensate from the cellulose process brown stock evaporation is still desirable since it will allow to eliminate said organic compounds contaminating the condensate and better control the pitch, thus allowing all the aforementioned benefits to be achieved in a closed cycle pulping process.

BRIEF DESCRIPTION OF THE INVENTION

The present invention is related to a method to produce a treated condensate substantially free of organic matter by treating the condensate with at least one of physical, chemical, chemical-physical treatment or combinations thereof.

Further, it is also provided a method to treat a condensate in a pulp processing fiber line utilizing multiple washing stages having at least a treated condensate circulating in a closed loop, prior to feeding the condensate into the fiber line, the method comprising the steps of:
a) identifying the colloidal organic compounds in the condensate;
b) subjecting the condensate to at least one chemical, physical, chemical-physical treatment or a combination thereof; and
c) reducing contamination of the condensate, feeding it to the last washer stage, or to some other stage of the pulping process.

DETAILED DESCRIPTION OF THE INVENTION

Figure 1:
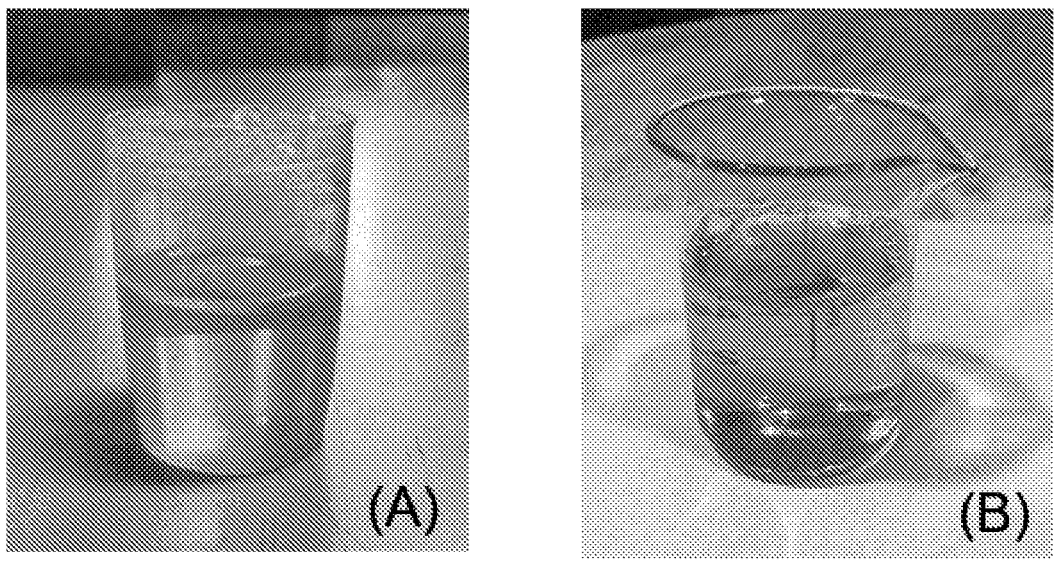
FIG. 1 shows images (A) of a sample of condensate 2 months after a plant stop, and (B) of a sample from the same location 10 months after the plant stop.

In cellulose plants using the Kraft process, black liquor, rich in organic and inorganic materials are a by-product. In order to recover these materials, the black liquor is sent to a chemical recovery stage, which consists of a process of concentration of this liquor via evaporation systems, followed by its burning in a recovery boiler, where the organic materials are burned and inorganic materials are calcined and their salts and alkalis are sent to be recovered in the caustification plant. The black liquor that reaches the evaporation system usually has a solids content between 14 to 18%. These solids are usually made up of 60% to 70% dissolved organic materials from wood and 30% to 40% inorganic materials from the cooking liquor. Common evaporator system includes a multi-effect evaporator having at least several effects, usually six effects, and operating at temperatures usually up to 150° C. The evaporated water is then condensed in a condenser, e.g., a surface condenser following the evaporation plant or a condenser for a stripper used in cleaning foul condensates from the evaporation plant.

Typically, hot water is used in the washing stages. Weak black liquor from the cooking stage is conducted from the cooking to an evaporation stage, in which part of the water is removed from the weak black liquor and, therefore, a strong black liquor is generated. The water removed from the weak black liquor, for instance, a condensate from the evaporation, is usually conduced to the washing stages of the brown stock. The strong black liquor produced in the evaporation stage is used to steam and power generation in the recovery boiler. In that boiler, the smelt (black liquor after burned) is washed with weak green liquor and send to the causticizing plant. The green liquor is further treated to obtain the white liquor that can be reused for the cooking. From the washing and oxygen stages of the brown stock, the pulp is conduced to the bleaching unit.

Black liquor is an aqueous solution made up of organic materials, such as lignin, resinous compounds, polysaccharides, alcohols. Black liquor also contains inorganic materials from the pulping or cooking system.

The main objective of the evaporation system is to concentrate the black liquor from the washing system, at an ideal concentration and density so that it is burned in the recovery boiler, where the organic material will be burned.

The condensate recovered from the evaporation process is widely used in mass washing plants as well as in bleaching plants, in order to save treated water or raw water.

The evaporation system as a whole acts on the chemistry of the liquor, including the hydrophobic materials contained in the organic portion present in the liquor.

According to the present disclosure, extractives and pitch are relating to organic substances of low molecular weight present at condensates from cellulose process brown stock evaporation that may be extracted with water and/or organic solvents. Examples of substances soluble at organic solvents are the classes of fat acids and esters, long chain alcohols, steroids, phenolic and glycosides substances. Lipophilic extractives may agglomerate during the pulping process, forming deposits known as pitch. The formation of pitch and its incrustations in the pulp and paper industries cause reductions in production, increase in expenses with equipment maintenance and a significant increase in imperfections at the final product, which causes a decrease in its quality.

Examples of pitch are:

| Organic Compounds Groups | Examples |
| --- | --- |
| Fatty acids | hexadecanoic, oleic and linoleic acids, 22-hydroxydocosanoic hydroxy acid |
| Triglycerides | Triglycerides |
| Sterols | β-sitosterol, β-sitostanol |
| Sterol esters | Sterol esters |
| Fatty alcohols, waxes | hexadecanol, octadecanol, 9-octadecen-1-ol (cis), octacosanol, docosanol, tetracosanol |
| Terpenes | Monoterpenes, sesquiterpenes, diterpenes, triterpenes, tetraterpenes, polyterpenes. |
| Phenolics, Aromatics | Simple phenols and phenolic acids, stilbenes, lignin's, flavonoids and tannins |

Figure 2:
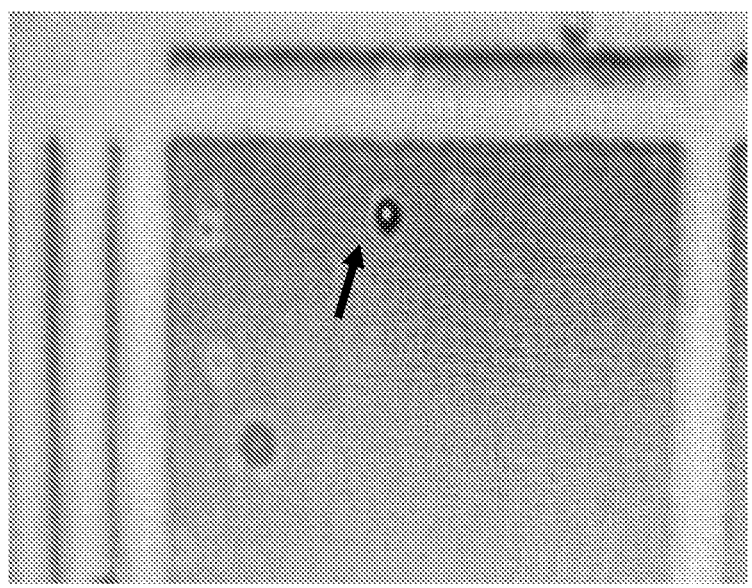
FIG. 2 shows a "Modified Paprican Colloidal Pitch Count Method" analysis of sample A with a microphotography depicting the colloidal pitch in the condensate indicated by an arrow.
Figure 3:
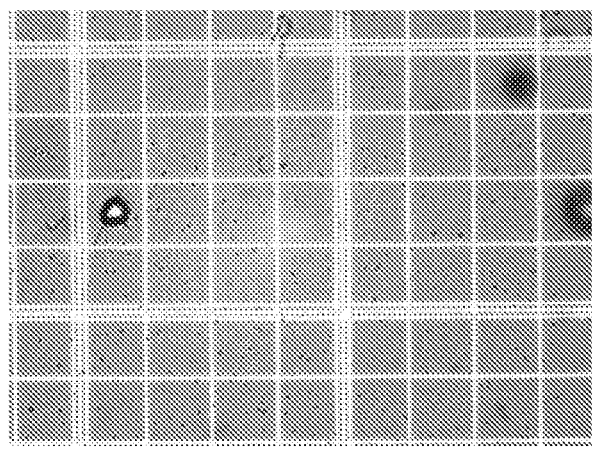
FIG. 3 shows an image of the pitch using an UV-visible Spectrophotometer.
Figure 4:
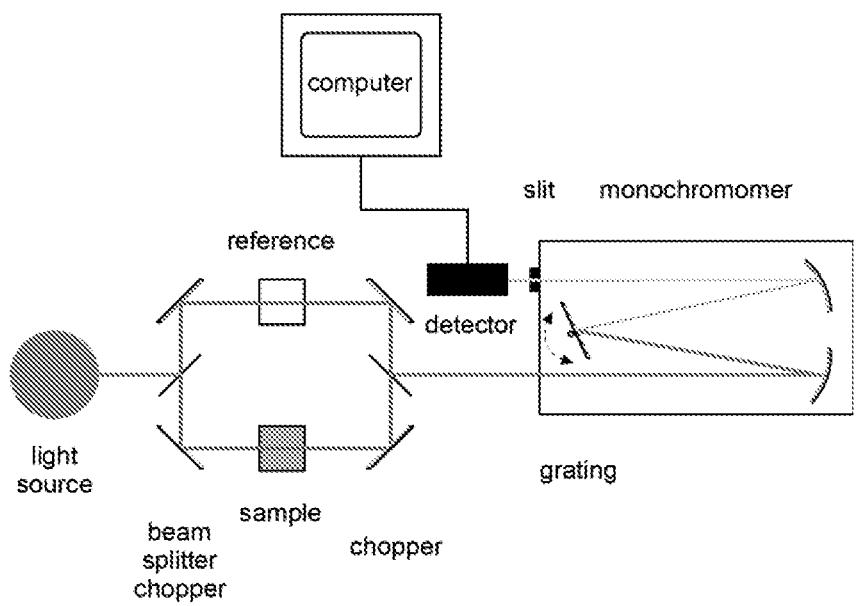
FIG. 4 shows a schematic view of the UV-visible Spectrophotometer measuring equipment Agilent Cary 300 Schematic.

Although the condensate is apparently free from organic matter, a closer inspection reveals relatively high levels of organic matter, i.e. pitch, in the condensate. FIG. 2 depicts a colloidal pitch in the condensate from cellulose process brown stock evaporation.

Parts of any organic or inorganic substance present in the condensate, will be taken to the fiber line where it should not be present, and this may have harmful effects in the process.

The presence of complex organic and inorganic structures and some levels of chemical and biochemical demands are due to the usual presence of more than 60 contaminants detected in the condensate, which require further treatment processes.

The present invention discloses methods for treating the condensate by initially identifying the colloidal pitch at cellulose process brown stock evaporation condensate. The steps performed according to the present invention produces separation of a pitch, mostly comprised of organic matter, from the condensate, allowing measurement and further identification of such compounds and amounts.

In this sense, one embodiment of the present invention is achieved by a method to produce a treated condensate substantially free of organic matter by treating the condensate with at least one of physical, chemical, chemical-physical treatment or combinations thereof.

Preferably, the method of treating the condensate from a Pulping operation which is the Kraft pulping process. The invention is based on the ability of the fiber line to treat condensable liquids and to provide a condensate having quality levels that allow the re-utilization of the condensate, returning the treated condensate into the pulping operation in a countercurrent way. Usual volumes are in the order of at least 100 m$^3$/h, usually even higher. A treatment of the condensate is performed before the condensate is returned to the pulping process fiber line closed loop with a method for producing treated condensate, substantially free of organic matter. Preferably, the methods of the present invention provide a reduction of at least 10 wt. % of the organic matter in a condensate thereby producing a treated condensate, preferably 50%, more preferably 80%. Alternatively, the method may be employed without recirculating the condensate, when a different destination is preferred, other than re-introducing the water in the fiber line, for instance, any other application or discard.

There are relatively high levels of organic matter (pitch) in the condensate. For instance, condensates can be found with levels of total organic carbon (TOC) as high as 1.000 mg/L. Thus, the method of the present invention is directed to condensates which have a total organic carbon and hydrophobic substances of 50 to 1000 mg/I.

As used herein, a treated condensate is a condensate that was subjected to a chemical, physical, or chemical-physical treatment as herein disclosed. The treated condensate of the present invention is substantially free of pitch having a TOC of less than 60 wt. %. Accordingly, the methods of the present invention disclose the organic matter as being substantially pitch.

Specifically, the present invention is achieved by a method that uses a combination of chemical, physical, chemical-physical treatment or combinations thereof. The treatment of the condensate may be in a system having at least one of coagulation, flocculation, or combinations thereof.

Preferably, a chemical reaction occurs first and is followed by a coagulation, flocculation, and decantation system, then followed by a physical retention system through filters.

Typically, the amount or concentration of organic matter in a medium is preferably measured by the Modified Paprican Colloidal Pitch Count Method. The Method consists in sampling the process pulp and counting the number of colloidal pitch particles at a known volume. The volume is known as Neubauer or hemacytometer. The rationale is as follows: colloidal pitch is a semi-solid particle that scatters light. As a consequence of the particle scattering it will block light or attenuate the light. The light attenuation is measured with UV-vis spectrophotometry and is proportional to the pitch concentration. The particle concentration involves measuring the number of particles and the cross-section or size of the particles. The scattering with particle size is nonlinear and the concentration dependence with light attenuation relationship is an approximation.

Lignin and some extractives absorb light through interactions between photons at specific wavelengths and electronic orbitals in the aromatic molecules. The wavelength dependence of lignin light absorbance is sensitive to pH, especially between pH 9 and 11. The spectrophotometer may be configured to subtract the lignin absorbance by using a filtered sample as a reference measurement.

Molecular absorbance is measured in the UV-visible region. Molecular absorbance in the UV-visible region is due to electron excitation in outer (frontier) orbitals or aromatic structures and groups of double bonds. Absorbance is related to light intensity and the concentration by Beer's Law.

Attenuation of light decreases light. This can happen due to molecular absorbance or it can happen because solid particles or structures are blocking the light. Attenuation is the more general term compared to absorbance. Solid or phase separated particles like pitch will attenuate light.

The science describing light interaction with particles in the size range of pitch (0.1-20 micron) is Mie Scattering.

Mie scattering is a mathematical approach to the interaction of light with particles that are greater than $\frac{1}{10}$ the wavelength of light. The Mie scattering equations defining interaction of light with particles depends on the number of particles, the particle size, the particle refractive index including the absorptivity of the material the particle is made of (T. M. Garver, K. H. Boegh, G. S. Hill, D. Henry, H. Y. Yuan, Analysis of the thermal variation of UV-visible attenuance of colloidal substances in whitewater. Pulp and Paper Canada 103, 20-24 (2002)).

Figure 5:
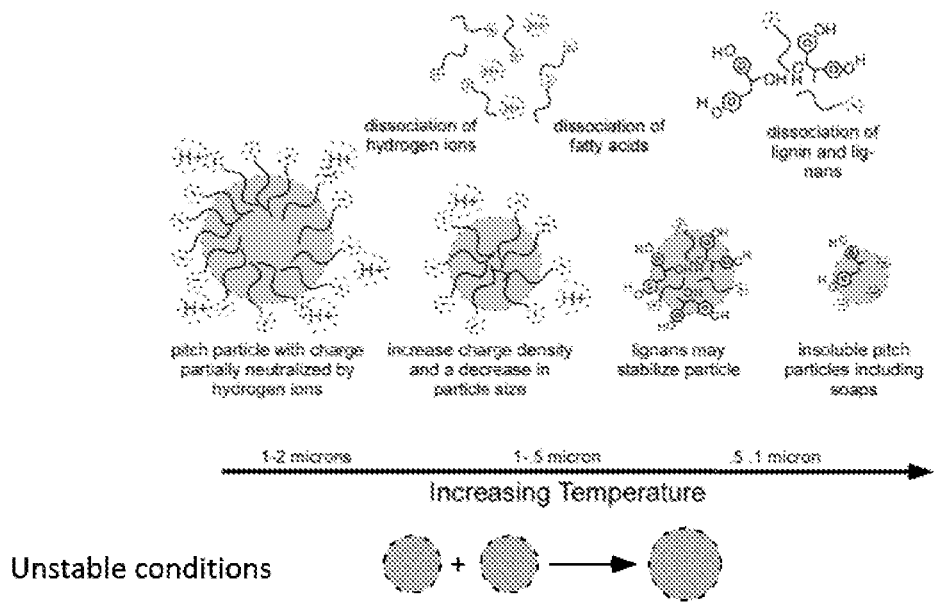
FIG. 5 shows a depiction of the dynamics of the method of Measurement of Thermal Variation of Light Attenuation.
Figure 6:
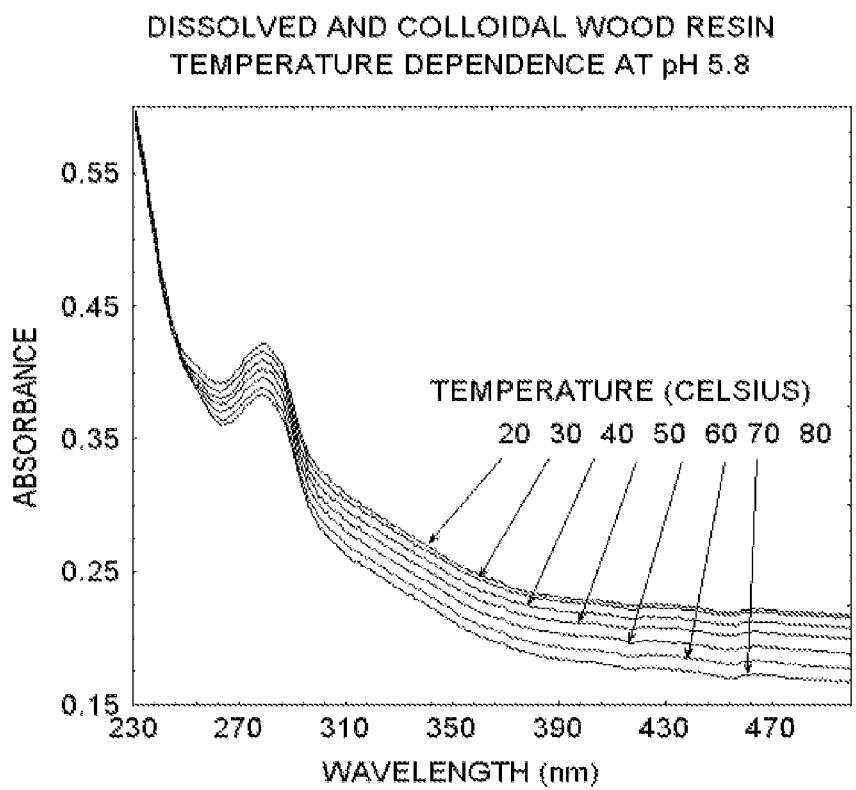
FIG. 6 shows a comparison of Delta and deposited pitch.
Figure 7:
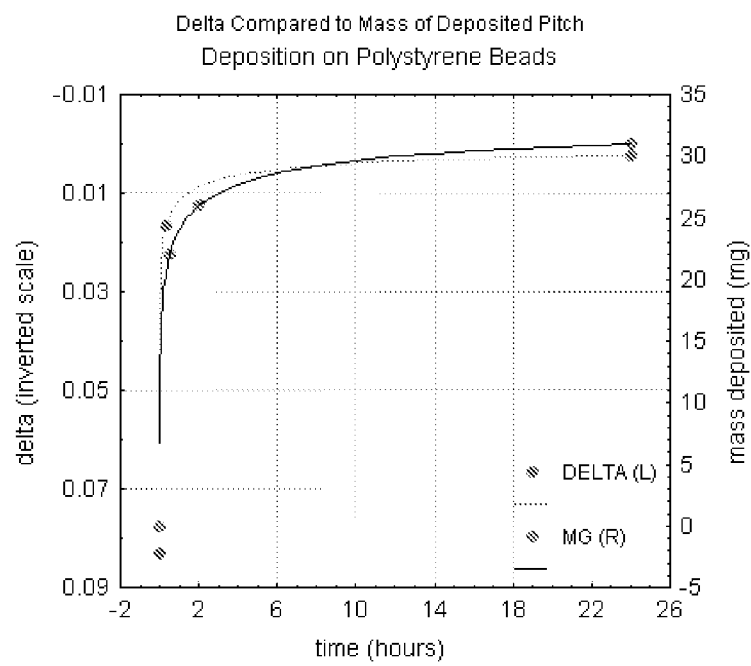
FIG. 7 shows Delta compared to mass of deposited pitch.
Figure 8:
FIG. 8 shows a depiction of multiple single housing assembly filter.
Figure 9:
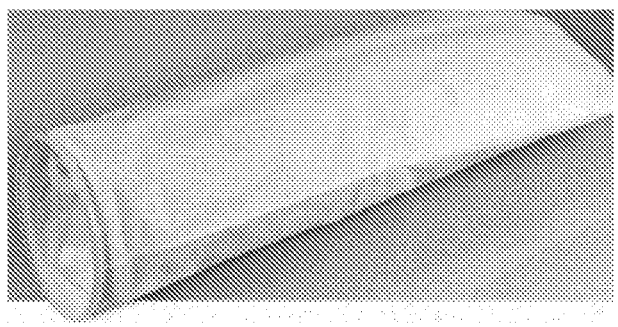
FIG. 9 shows a depiction of a bag of filter.
Figure 10:
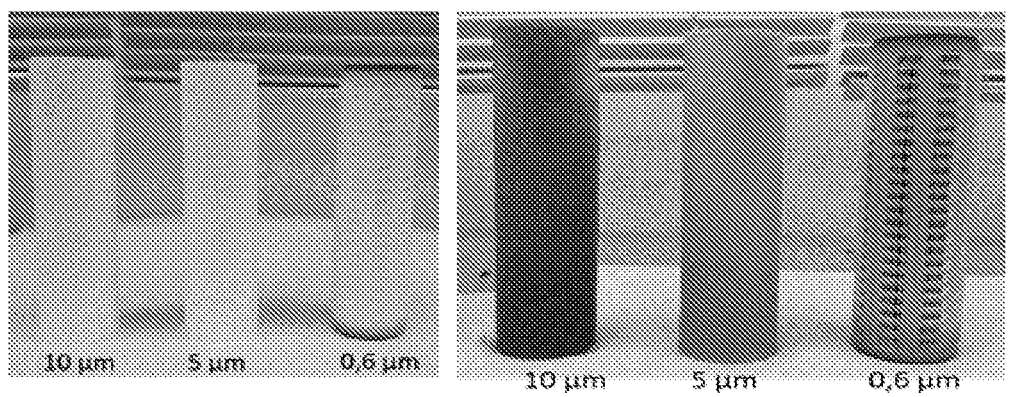
FIG. 10 shows a picture of the filters used to filter condensates before (left) and after (right) the methods of the present invention.
Figure 11:
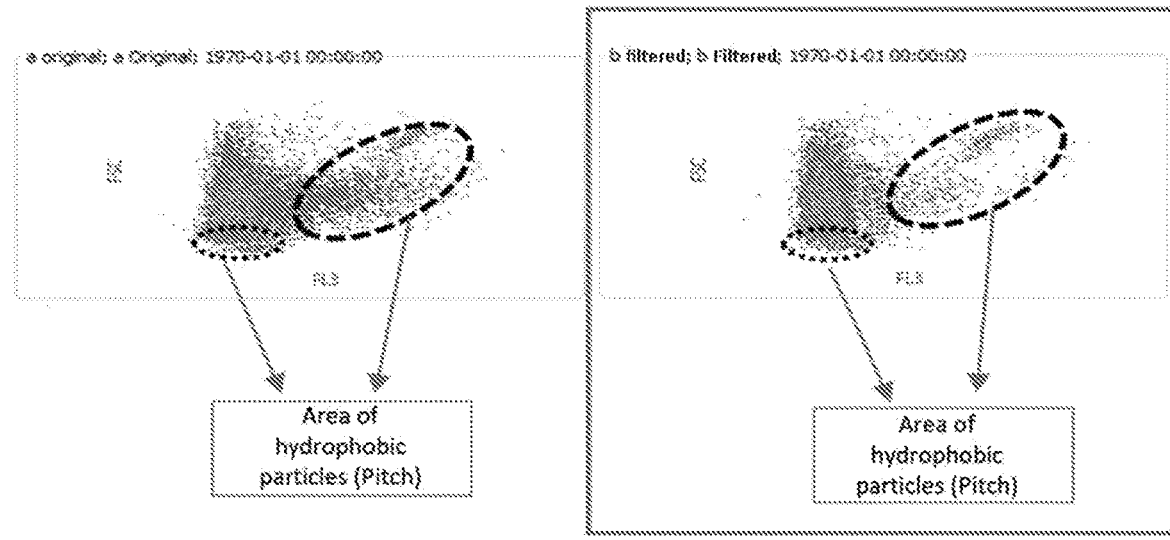
FIG. 11 shows a distribution of particles from the condensate before (left) and after (right) the methods of the present invention.
Figure 12:
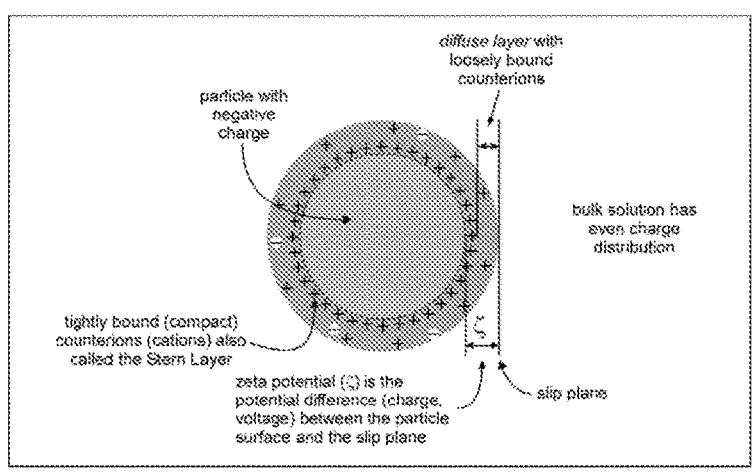
FIG. 12 shows an illustrative explanation of the Zeta Potential and Particle Charge.

At FIG. 5 there is a schematic view of the UV-visible Spectrophotometer measuring equipment Agilent Cary 300 Schematic.

In one embodiment of the present invention, the method to treat a condensate of a pulping process comprises the following steps:
a) identifying the colloidal organic compounds in the condensate;
b) subjecting the condensate to at least one of chemical, physical, chemical-physical treatment or a combination thereof; and
c) reducing contamination of the condensate, feeding it to the last washer stage or to some other stage of the pulping process One example of other stage of the pulping process is the bleaching stage of said process.

It is a further preferred embodiment of the present invention a method to treat a condensate in a pulp processing fiber line utilizing multiple washing stages having at least a treated condensate circulating in a closed loop, prior to feeding the condensate into the fiber line, the method comprising the steps of:
a) identifying the colloidal organic compounds in the condensate by analyzing the TOC;
b) subjecting the condensate to at least one treatment of chemical, physical, chemical-physical treatment or a combination thereof;
c) reducing the organic contamination of the condensate by mechanically treating it;
d) returning the condensate in countercurrent to the pulping circuit.

Preferably, the analysis of the TOC in step (a) is made on-line; the treatment in step (b) is pH adjustment and/or adding flocculant agents and coagulants; and the mechanical treatment of step (c) is decantation, filtration or flotation.

Further, the condensate is returned in countercurrent to the pulping circuit, more preferably, the condensate is returned in to the pulping circuit by adding the condensate at the brown stock press equipment, at the DDW (Drum Displacer Washer) equipment, or both.

The condensate treatment is more preferably, a combination of flocculation and coagulation succeeded by at least one decantation and filtration step.

Also, the present invention may be embodied by a chemical, a physical or a chemical-physical treatment. Further embodiments may encompass one or more treatments, in parallel or serial.

In one preferred embodiment, the present invention may be automated, comprising the following the sequence of steps:
a) analyzing the TOC in the condensate, on-line;
b) sending a signal to the treatment dosing system;
c) dosing the coagulant to the condensate in the range of 0.2 grams to 10 grams per gram of organic informed TOC;
d) waiting from 2 to 15 minutes to proceed with dosing the flocculent to the condensate in the range of 0.3 grams to 20 grams per gram of organic material informed by the TOC;
e) sending the treated condensate to the decantation tank for a retention time between 20 to 40 minutes;
f) sending the free condensate of the deposited material to the site for filtration with filters of 10 microns;
g) filtering the condensate of step in a filtration system composed of filters of 1.0 micron.

Preferably, in step (d) the waiting time is 5 minutes and the retention time in step (e) is 30 minutes.

Further, it is worth mentioning that the condensate is composed of different molecular masses, with different behavior and different deposition speed. Thus, the final removal of the flocculates of the micelles that have not deposited in step (f) will be conducted in step (g) as described above.

Examples of suitable filters or filtration processes are pocket filters, cake filters or any other filter capable of retaining the pitch colloids. At the experimental tests, granulometries of 10 microns and absolute for particles with less than 1.0 micron. For instance, the multiple single bag filter comprises individual filters of 30 $m^3$, which may be used in multiples.

Coagulants adequate to the present invention are cationic or anionic polyamines.

Adequate flocculants to the present invention are cationic polyacrylamide, an anionic polyacrylamide, or combinations thereof. Polyacrylamides with different molecular weights may be used.

EXAMPLES

Example 1: Pitch Response to Heat

Under most circumstances increases in solution temperature will lead to dissociation of protons and a particle size decrease. This results in a decrease in light attenuance. At higher temperatures we have observed dissociation of lignin from pitch particles.

It is also assumed that more soluble fatty acids will dissociation with increases in temperature.

Under some circumstances the surface of the pitch cannot dissociate protons or other components to stabilize with increased charge or decreased size. Under these circumstances an increase in temperature may lead to agglomeration and increases in light attenuation.

Measurements are made at different wavelengths and temperatures. The data is analyzed to characterize the temperature dependence of the light extinction. The thermal characterization provides parameters that relate to pitch stability and concentration.

Delta is high when the amount of pitch that may be deposited is high. These results are consistent with the delta measurement providing a propensity to deposit or a measure of pitch tackiness.

Example 2: Filtration

In one preferred embodiment of the invention, a condensate treatment may be a filtration. Preferably, the filtration is performed with filters having apertures of less than 10 μm, more preferably less than 1 μm. A condensate purification treatment performed with a filter having an aperture of less than 10 μm provided a retention of 0.000082 g/L and a purification performed a filter having an aperture of less than <1.0 μm provided a retention of 0.006754 g/L, which translates into 49 kg/day of extracted material from the condensate, when performed at a condensate flow of 300 $m^3$/h. When combined, for instance, the evaluation of a condensate having 0.2376 mg/L of extractives, the residual total organic matter is 0.0984 g/L, providing a removal efficiency of 59% after the first filter with 10 μm, and after both filters of 10 μm and 1 μm, the total organic matter is 0.0220 g/L, with a removal efficiency of 91%, in relation to the sample of original condensate, according to the extract content analysis with dichloromethane solvent analysis and Cytometry. When only filtration is performed, according to the present invention, an average Chemical Oxygen Demand (COD) of 1.558 mg/L is achieved, with a Total organic carbon (TOC) of 393.2 mg/L; from a condensate originally having an average COD of 1.637 mg/L and TOC of 392.9 mg/L. In this sense, filtration does not significantly impact COD or TOC, even though with significant results in organic matter removal.

Example 3: pH Reduction

Another embodiment of the present invention is a reduction of the pH of the condensate to provide a treated condensate. Sulfuric acid ($H_2SO_4$ at 10%) is added and the condensate is thus subjected to a pH of at least 6, preferably 5, before re-entering the fiber line. In an experiment, the pitch micelles counting increased from $1.1 \times 10^8$, in the condensate, to $1.30 \times 10^8$ in the treated condensate, with an increment of 18.4%. In another experiment, the pitch micelles counting increased from $8.80 \times 10^6$, in the condensate, to $1.32 \times 10^7$ in the treated condensate, with an increment of 50%.

TABLE 1

Micelles formation analyses performed by Cytometry.

| | pH | Pitch (micelles/cm3) | Corrected pH | Pitch (micelles/cm3) | Increment of micelles (%) |
|---|---|---|---|---|---|
| A | 8.35 | $6.16 \times 10^6$ | 5 | $8.80 \times 10^6$ | 42.9 |
| B | 6.97 | $8.80 \times 10^6$ | 5 | $1.23 \times 10^7$ | 40 |
| C | 7.15 | $8.80 \times 10^6$ | 5 | $1.32 \times 10^7$ | 50 |
| D | 7.18 | $1.10 \times 10^8$ | 5 | $1.30 \times 10^8$ | 18.4 |

Example 4: Filtration and pH Adjustment

In another experiment, combination of filtering and pH adjustment was performed. Filters of 10 μm, 5 μm and 0.6 μm were used in a condensate having a pH adjusted to 3. The total hydrophobic particles were measured, with a counting of particles in the condensate of 2.3 particles/mL decreasing to 0.5 particles/mL in the treated condensate, with concurrent particle average size in the condensate of 5.02 particles/mL decreasing to 1 μm in the treated condensate, which corresponds to a decreased total surface area of organic matter in the treated condensate. Further, the number of identified compounds in the untreated condensate decreased from 47 compounds to 30 compounds in the treated condensate, as per extraction with solvents (DCM/Dioxane), using rotary evaporator to dry and evaporate the solvents. After dry, the content is extracted. Identification was used with CG-MS.

Figure 13:
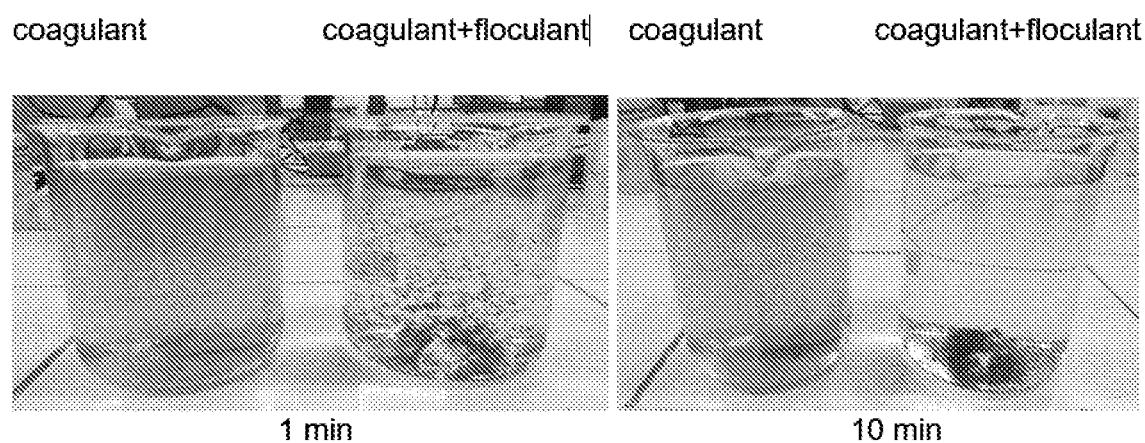
FIG. 13 shows a picture of condensates 1 minute (left) and 10 minutes (right) from the application of the methods of treating the condensate of the present invention.

From FIGS. 13 and 14 it is possible to observe a lower amount of hydrophobic particles after filtration. Filtration may be performed as usual, passing the condensate through a filter or apertures to physically retain the organic material, and introducing the treated condensate into the closed loop or subjecting the treated condensate to another treatment herein described.

Example 5: Coagulation

Another embodiment of the present invention is a coagulation treatment of the condensate. Coagulants adequate to the present invention are cationic or anionic polyamines.

Preferably, coagulants are used in proportion to the organic matter present at the condensate prior treatment. Preferably, it is used from 0.2 g to 10 g of coagulant for every gram of organic matter.

Coagulation may be performed as usual, mixing the condensate with a polymer coagulation composition; separating the coagulated particulates from the treated condensate and introducing the treated condensate into the closed loop or subjecting the treated condensate to another treatment herein described.

Example 6: Flocculation

Another embodiment of the present invention is a flocculation treatment of the condensate. Adequate flocculants to the present invention are cationic polyacrylamide, an anionic polyacrylamide, or combinations thereof. Polyacrylamides with different molecular weights may be used.

Preferably, flocculants are used in proportion to the organic matter present at the condensate prior treatment. The present invention discloses flocculants from 0.3 g to 20 g of flocculant for every gram of organic matter.

Flocculation may be performed as usual, mixing the condensate with a flocculant composition; separating the flocculated particulates from the treated condensate and introducing the treated condensate into the closed loop or subjecting the treated condensate to another treatment herein described.

The condensate is left with the flocculants until zeta potential is reached substantially between −1 mV to −50 mV. In colloids, zeta potential is the electric potential difference across the ionic layer around a charged colloid ion. Put another way, it's the potential in the interface double layer at the slipping plane. Typically, the higher the zeta-potential, the more stable the colloid. Zeta potential that are less negative than −15 mV typically represents the beginnings of agglomeration of particles. When the zeta-potential equals zero, the colloid will precipitate into a solid. Since the physical properties of suspensions and colloids largely depend on the properties of the particle-liquid interface, knowing the zeta potential has practical applications among which we can cite: destroy undesirable colloidal dispersions during water and sewage treatment, Reduce cost of additives by calculating the minimum amount needed to achieve a desired effect, such as amount of flocculants added to water during water treatment, characterize the properties of clay-water systems, and many others.

In an experiment performed according to the present invention, after 15 minutes the separation of the organic matter from the condensate was noticed. When flocculation is performed, according to the present invention, a Chemical oxygen demand (COD) of 281 mg/L is achieved, with a Total organic carbon (TOC) of 55.2 mg/L; from a condensate originally having a COD of 380 mg/L and TOC of 95.3 mg/L. The COD at the experiment decreased according to Table 2:

TABLE 2

| Sample | DQO (mg/L) C |
|---|---|
| Untreated sample | 380 |
| Sample after coagulation | 281 |
| Sample after coagulation and filtration | 282 |

The condensate is left in contact with the coagulant for at least 1 minute, preferably 5 minutes.

Example 7: Coagulation and Flocculation

In a further embodiment of the present invention there is a combination of coagulants and flocculants. Ideally the removal of pitch is sought as pitch having as main organic composition compounds as butyric acid, thiophene carboxylic acid, vanillic acid, syringic acid, octasulfur, β-Sitosterol, di-hydro-2-Furanone and Glutaric acid.

Example 8: Results

The method of the present invention when using a combination of coagulants and/or flocculants and filtration provides a reduction of pitch in the condensate of at least 50 wt. %, preferably 80 wt. %, more preferably 90 wt. %, even more preferably 98 wt. %. Also, the present invention provides a condensate having a TOC value of less than 60 mg/L. Also, the present invention provides a method of reducing the TOC in a condensate of at least 10% of the TOC at the treated condensate, preferably a reduction of 20%, more preferably a reduction of 40%, even more preferably a reduction of 60% of the TOC at the treated condensate, when compared to the untreated condensate.

The invention claimed is:

1. A method to treat a condensate in a pulping process comprising a step of treating the condensate with at least one treatment of physical, chemical, chemical-physical, or combinations thereof to form a treated condensate comprising the following steps:
   identifying colloidal organic compounds in the condensate;
   subjecting the condensate to a combination of coagulation and flocculation; and
   reducing contamination of the condensate to form a treated condensate free of organic matter and pitch collodial, feeding it to a last washer stage or at some other stage of the pulping process, wherein the coagulation is performed with at least a cationic polyamine, an anionic polyamine, or combinations thereof, and wherein the flocculation is performed with at least a cationic polyacrylamide, an anionic polyacrylamide, or combinations thereof.

2. The method according to claim 1, wherein the organic compounds are substantially pitch.

3. The method according to claim 1, wherein the condensate has a total organic carbon (TOC) of at least 30 mg/L in step (a).

4. The method according to claim 1, wherein coagulation is performed using from 0.2 g to 10 g of coagulant for every gram of organic matter.

5. The method according to claim 1, wherein the condensate is in contact with the coagulant for at least 2 minutes.

6. The method according to claim 1, wherein flocculation is performed using from 0.3 g to 20 g of flocculant for every gram of organic matter.

7. The method according to claim 1, wherein flocculation is performed until zeta potential is substantially between −1 mV to −50 mV.

8. The method according to claim 1, wherein the condensate is from an evaporation step of a pulping operation.

9. The method according to claim 1, wherein the treated condensate is returned to a pulping operation in countercurrent.

10. The method according to claim 1, wherein the treated condensate is returned to a washing system at a pulping operation in countercurrent.

11. The method according to claim 1, wherein the pulping process is a Kraft pulping or a modified Kraft process.

12. The method according to claim 1, wherein the treatment of the condensate is performed before the condensate is returned to a washing system of the pulping process in a closed loop.

13. The method according to claim 1, wherein the treatment of the condensate provides a reduction of pitch in the treated condensate of at least 50 wt. %.

14. The method according to claim 1, wherein the method provides a reduction of total organic content of at least 10% of the total organic content at the treated condensate, when compared to the untreated condensate.

15. The method according to claim 1, wherein the treated condensate has a total organic content value of less than 60 mg/L.

* * * * *